Patented Jan. 26, 1943

2,309,408

UNITED STATES PATENT OFFICE 2,309,408

SIDE CHAIN KETONES OF THE CYCLOPENTANOPOLYHYDROPHENANTHRENE SERIES AND PROCESS OF MAKING SAME

Karl Miescher, Riehen, and Albert Wettstein, Basel, Switzerland, assignors, by mesne assignments, to Ciba Pharmaceutical Products, Incorporated, Summit, N. J., a corporation of New Jersey No Drawing. Application July 5, 1938, Serial No. 217,622. In Switzerland July 9, 1937

7 Claims. (Cl. 260—239)

By this invention α-substituted side chain ketones of the cyclopentanopolyhydrophenanthrene series can be obtained by causing a carboxylic acid halide which is derived from a cyclic ketone of the cyclopentanopolyhydrophenanthrene series or from an enol derivative thereof to react with an aliphatic diazo compound and if desired converting the diazo ketone so obtained into an oxyketone by the action of a hydrolyzing agent, or into an ether thereof by the action of an alcohol or a phenol or into an ester thereof by the action of an organic or inorganic acid, and if required saponifying ether or ester groups present.

As parent materials for the invention there may be used compounds of the cyclopentanopolyhydrophenanthrene series containing in the ring structure keto-groups or their enol derivatives, for example enol esters or enol ethers, and containing carboxylic acid halide groups in side chains. Naturally further substituents may also be present for example free or substituted hydroxyl, carbinol or amino-groups, halogen atoms, hydrocarbon residues and so on. The parent materials may be saturated or may contain one or more unsaturated linkages. Consequently there may be used for example halides of saturated or unsaturated aetio-cholanic acids such as $\Delta^{4:5}$-3-keto-aetio-cholenic acid, 3:11-diketo-aetiocholanic acid, 3-keto-11-aetio-cholanic acid, $\Delta^{4:5}$-3-keto-11-oxy-aetio-cholenic acid; furthermore halides of keto-bisnor-cholenic acids, keto-aetio-allo-cholane-17-acetic acids, 3-carboxy-aetio-allo-cholanones-(17), 3-carboxy-11-keto-aetio-cholenic acids, of analogous ketocarboxylic acids of the oestrane or hydro-oestrane series or of stereoisomers and derivatives, including in particular enol derivatives, of the said compounds. Such carboxylic acids are obtainable for example by the progressive or radical degradation of sterols, bile acids, genins from cardiac glucosides or by synthesis from cyclic ketones etc.

Among aliphatic diazo compounds there are understood for example diazo-methane, diazomethanes mono-substituted with any desired radicals, particularly radicals containing carbon such as diazo-ethane, diazobutane, diazopropylene, phenyldiazomethane, diazoacetophenone, diazo-carboxylic acid derivatives such as diazoacetic acid-esters, -amides, -nitriles and the like.

The reaction of the carboxylic acid halide with the diazo compound may proceed in such a manner that a diazo ketone —CO—C.N$_2$ 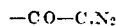

is obtained with elimination of hydrogen halide; this reaction occurs for example when there is used a diazo compound containing a carbonyl group, such as a diazo-fatty acid derivative, and in general especially when the diazo compound is maintained permanently in excess so that it unites with the hydrogen halide formed. On the other hand α-halogen ketones are obtained directly, for example when the diazo compound is added gradually to the acid halide so that the hydrogen halide liberated by the condensation reacts preferentially with the diazo ketone formed intermediately. If the parent materials contain besides the acid halide group further active groups such as hydroxyl or amino-groups these may undergo alkylation by a side reaction. It is also possible that ester groups may be exchanged for ether groups.

The diazo ketones so obtained, either in the crude state or after isolation and purification, may be converted in manner itself known into oxypolyketones —CO—CH.OH 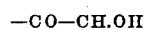

or their partial enol derivatives by the action of a hydrolyzing agent for example by boiling with water or dilute acid such as sulfuric acid, or by treating with organic sulfonic acids such as methanesulfonic acid, toluenesulfonic acid; or into ethers thereof —CO—CH.OR 

by the action of an alcohol or a phenol, for example by heating with methanol, ethanol, cyclohexanol, triphenylcarbinol or cresol; into esters thereof, for example —CO—CH.O.OC.R 

by the action of an organic acid such as acetic acid, proprionic acid, butyric acid, crotonic acid, palmitic acid, benzoic acid, phenylacetic acid; or finally into esters of inorganic acids, for example the α-halogen ketones —CO—CH.X 

by the action of an inorganic acid, especially one poor in water, such as hydrochloric acid, hydrobromic acid, iodic acid, a phosphoric acid or a boric acid and the like. Finally ether or ester groups newly introduced in the process or already present in the parent material, including for example enol derivatives, may be saponified. Regard must be had therein to the relative sensitivity of the α-oxyketonic grouping to alkalies, so that it is of advantage to saponify with acids or quite feeble alkalies, such as bicarbonates.

The products of the invention are extremely valuable therapeutic compounds or they can be converted into such compounds. Like progesterone and corticosterone they contain keto-groups or enol derivatives thereof in the ring system and in the side chain and therefore do not require to be subjected to any further oxidation process for obtaining these or analogous compounds, in contrast to compounds substituted in the ring system, for example in 3-position, by hydroxyl. The displacement of the step of oxidizing hydroxyl groups to an indifferent stage consequently avoids the usually very undesirable application of this step in the stage of the reactive α-oxyketone.

The following examples illustrate the invention, the parts being by weight:

*Example 1*

A solution of 1 part of $\Delta^{4:5}$-3-keto-aetio-cholenic acid chloride (prepared for example from $\Delta^{5,6}$-3-oxy-aetio-cholenic acid-ethyl-ester by dehydration with aluminium-iso-propylate in the presence of cyclohexanone, saponification of the resultant $\Delta^{4,5}$-3-keto-aetiocholenic acid- ethylester to the corresponding free acid, which is subsequently treated with a mixture of thionyl chloride and calcium carbonate) in benzene is allowed to drop slowly into a solution in ether of diazo-methane prepared from 2 parts of nitrosomethylurethane. After evolution of nitrogen has ceased the whole is allowed to stand for some time longer and the yellow solution is then cautiously concentrated, whereby there is obtained from it 21-diazo-progesterone which decomposes at 75° C. This is shaken at a raised temperature with dilute sulfuric acid and benzene and when no more nitrogen is evolved the two layers are separated, the aqueous acid layer is again extracted with benzene and the benzene solutions are dried. By evaporation of the benzene solutions there is obtained $\Delta^{4:5}$-21-oxypregnenedione-(3:20) of the formula

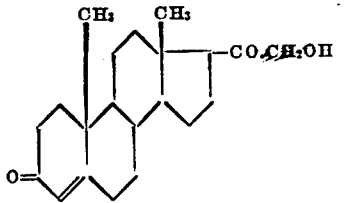

which melts at 139–141° C. after recrystallization from dilute methanol. When tested on animals it has the effect of maintaining life in rats from which the suprarenal glands have been removed.

The process may start from a halide of a corresponding compound containing a hydroxyl or an acyloxy group in 11-, 12- or 17-position instead of from the chloride of $\Delta^{4:5}$-3-keto-aetiocholenic acid. There are thus obtained instead of desoxycorticosterone compounds identical or isomeric with corticosterone, or their derivatives. If the diazo-progesterone is treated with an organic or inorganic acid poor in water or with an alcohol or a phenol instead of with dilute sulfuric acid there are obtained the corresponding compounds esterified or etherified in 21-position, for example the acetic, propionic, butyric, valerianic, benzoic or phosphoric esters or the methyl, ethyl or trityl ethers. If desired, they may subsequently be saponified, for example by the action of acids or feeble alkalies.

*Example 2*

A solution of 1 part of diazomethane in ether is added to a solution of 5 parts of the chloride of $\Delta^{3:4}$-$\Delta^{5:6}$-3-acetoxy-aetio-choladienic acid (prepared for example from $\Delta^{4,5}$-3-keto-aetiocholenic acid, obtainable as described in Example 1, by heating it for 45 hours with a mixture of acetic anhydride and freshly fused potassium acetate, boiling the anhydride so formed with glacial acetic acid, and subsequently treating with thionyl chloride). The whole is allowed to stand for a long time and the greater part of the ether is then evaporated. Dry hydrogen chloride is introduced into the remaining benzene solution at a raised temperature. When evolution of nitrogen has ceased and the solution has become colorless it is washed with bicarbonate solution and water, dried and evaporated. There is thus obtained the 3-enol-acetate of 21-chloro-progesterone, namely the $\Delta^{3:5}$-pregnadiene-20-one-21-chloro-3-ol-acetate of the formula

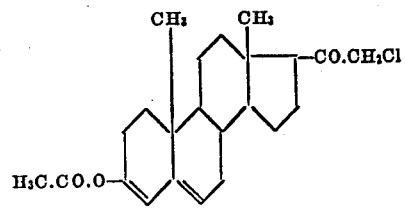

This product is a valuable parent material for the preparation of progesterone or its enol-acetate.

If hydrogen bromide or hydrogen iodide is used instead of hydrogen chloride the corresponding 21-bromo- or 21-iodo derivative is obtained. The same halogen compounds are obtained if dry hydrogen halide is caused to act on the preformed corresponding diazo-ketone.

What we claim is:

1. A process for the manufacture of α-substituted side chain ketones of the cyclopentanopolyhydrophenanthrene series, comprising causing an aliphatic diazo-compound to react with a compound of the said series containing in one of the positions 3 and 17 a side chain carrying a carboxylic acid halide grouping and in at least one of the positions 3, 11 and 17 so far as not occupied by the said side chain a member of the group consisting of a keto-group and an enol derivative thereof.

2. A process for the manufacture of α-substituted side chain ketones of the cyclopentanopolyhydrophenanthrene series, comprising causing an aliphatic diazo-compound to react with a compound of the said series containing in one of the positions 3 and 17 a side chain carrying a carboxylic acid halide grouping and in at least one of the positions 3, 11 and 17 so far as not occupied by the said side chain a member of the group consisting of a keto-group and an enol derivative thereof, and treating the product thus obtained with a hydrolyzing agent.

3. A process for the manufacture of α-substituted side chain ketones of the cyclopentanopolyhydrophenanthrene series, comprising causing an aliphatic diazo-compound to react with a compound of the said series containing in one of the positions 3 and 17 a side chain carrying a carboxylic acid halide grouping and in at least one of the positions 3, 11 and 17 so far as not occupied by the said side chain a member of the group consisting of a keto-group and an enol derivative thereof, and treating the products thus obtained with an inorganic acid.

4. A process as claimed in claim 1 wherein as an inorganic acid there is utilized the hydrogen halide liberated by the condensation of the acid halide with the diazo-compound, and then treating the product thus obtained with a hydrolyzing agent.

5. The compounds of the cyclopentanopolyhydrophenanthrene series, containing in one of the positions 3 and 17 a side chain carrying a keto-group, in $\alpha$-position to this keto-group a diazo-group and in at least one of the positions 3, 11 and 17 so far as not occupied by the said side chain a member of the group consisting of a keto-group and an enol derivative thereof.

6. 21-diazo-progesterone.

7. The compounds selected from the group consisting of 21-halogen-progesterone and the 3-enol derivatives thereof.

KARL MIESCHER.
ALBERT WETTSTEIN.